Oct. 21, 1947.　　　W. L. FLEISHER　　　2,429,265
APPARATUS FOR HUMIDIFYING AND CLEANING GASEOUS FLUIDS SUCH AS AIR
Filed Aug. 16, 1944　　　3 Sheets-Sheet 1

INVENTOR
Walter L. Fleisher
BY Kenyon & Kenyon
ATTORNEYS

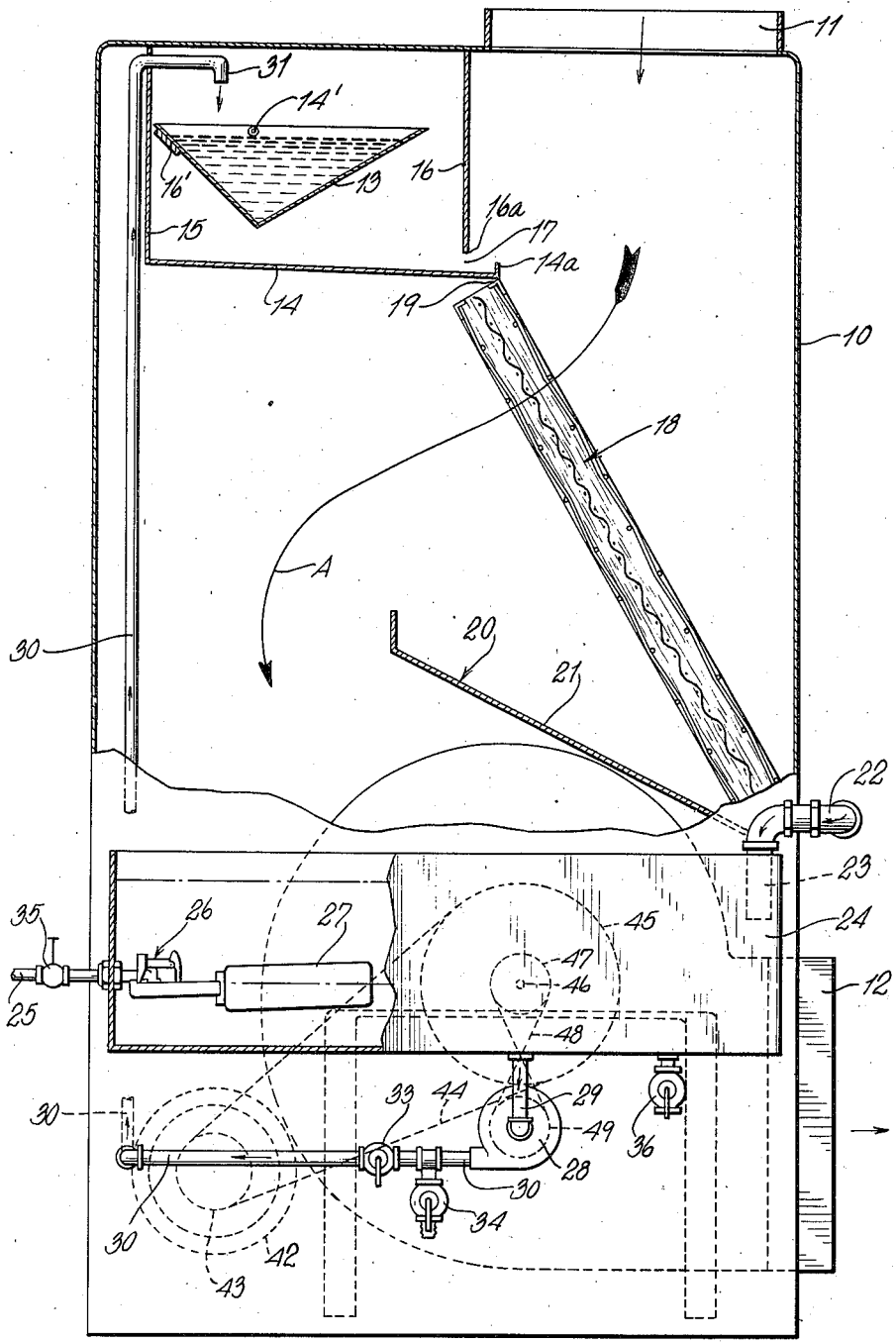

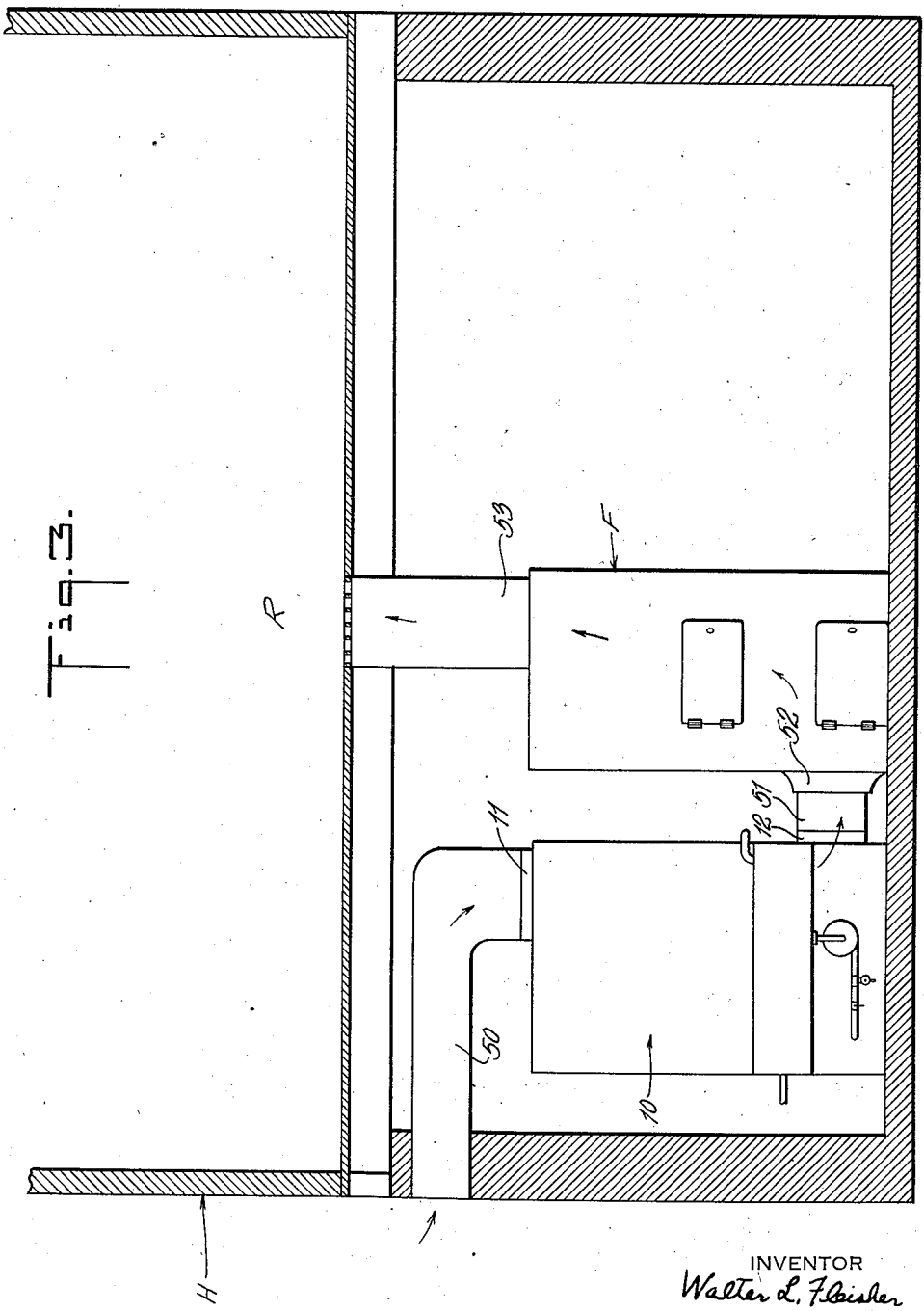

Patented Oct. 21, 1947

2,429,265

UNITED STATES PATENT OFFICE 2,429,265

APPARATUS FOR HUMIDIFYING AND CLEANING GASEOUS FLUIDS SUCH AS AIR

Walter L. Fleisher, New City, N. Y.

Application August 16, 1944, Serial No. 549,668

4 Claims. (Cl. 183—9)

This invention relates to apparatus for obtaining intermittent humidification with constant cleaning of air or other gas.

In a system of air ventilation, where the air is carried through a filter, cell or screen, which is wetted continuously or intermittently by liquid, preferably water, dumping over the top of the screen and flowing down the screen, or in a capillary cell, with the unevaporated water wasting to the sewer, one of two things is likely to occur. Either too much water is evaporated and too high a relative humidity occurs in the enclosure to which the air is directed, or, if the water is fed to a tilting pan or other means of intermittent water flow very slowly so that wetting of the screen or cell occurs only once or twice an hour, which is all that is ordinarily required for humidification of a well constructed house, the cell or screen is dry for such a length of time, that the very loosely packed filaments of the capillary cell or the screens with large interstices no longer act as good dust eliminators or collectors, due to the fact that they are dry and untreated with adhesives or other compositions, such as are generally used in dry filters to collect the dust.

To overcome this condition and to effect additional results, I have invented a method of and apparatus for utilizing, in combination, a solution of triethylene glycol and water or other solutions or emulsion, of which water is the lesser part, to effect the wetting of a slanting cell or screen, the wetting being effected by means of a tilting or unbalanced pan or bucket, or other suitable equipment located above the screen.

In a household filter and humidifying apparatus supplying for example 1300 cubic feet per minute, I have discovered that for thorough washing and wetting of my filter cell or screen, at least two gallons of solution must be dumped over a cell or screen about 25" in length and 20" wide each time the dump operates in order to accomplish the thorough scrubbing which is essential for the removal of the dirt reposing on the screen due to the passage of air. If this liquid is only water, the evaporation due to one or two dumps of two gallons per dump per hour is sufficient for humidification purposes; but as all water reposing on the screens or strands thereof is completely evaporated in a period of less than four minutes, as a dust arrester the cell or screen is only efficient for a very small portion of the total operating period. It is an object of this invention to maintain the cell or screen efficient as a dust arrester throughout the operating period.

I have discovered that a solution of about 60% to 80% triethylene glycol and 40% to 20% water or other proportions of solutions or emulsions having similar characteristics, which are listed in the paragraph below, when dumped from my tilting pan, will deposit a solution on my screen which is sufficient to give about a 40% relative humidity in the wintertime without the danger of oversaturation; while the viscosity of the solution or emulsion is sufficient to coat the cell filaments for a sufficient length of time so that the coated strands act as dust collectors during the non-flushing period of the intermittent flushing cycle and so that when flushing does occur during the prescribed cycle, sufficient aqueous solution is dumped over the cell strands or screen filaments to wash the solution clinging to the strands into a collecting pan or sump, which is an integral part of this device, and still enough evaporation of water takes place to create the required humidification.

Other solutions or emulsions having similar characteristics that may be used as alternatives for triethylene glycol are glycerine and water, or any of the glycerine derivatives, or similar combinations entirely miscible with water and that have no tendency to harden or crystalize on the filter strands. The percentages of these substances with water will be proportional to the vapor pressures of the basic substances and the vapor pressures of the substances should be low so that their dew points are not below the lowest dew point carried in the enclosures which would tend to deposit out the basic substances on surrounding walls, etc., causing a feeling of stickiness. In other words such substances are those that are absorbers but are not readily vaporized. They will exhibit the characteristics pointed out in the preceding paragraph as to triethylene glycol and water solution.

In U. S. Patent No. 1,696,935 to Allen, issued January 1, 1929, and in Fleisher Patent No. 2,356,757, issued August 29, 1944, there have been shown the application of small amounts of water either to a dumping or to a syphoning device so that the water, when it accumulates in either of these devices, eventually spills or dumps a comparatively large amount of the liquid, compared to the amount continuously supplied to these dumping or syphoning devices. This liquid once used is lost. In my present invention, because of the cost of the viscous solution, it is essential to conserve and re-use the solution for an indefinite period of time. Consequently, the solution which is dumped over the sloping cell or screen is collected on a sloping plate underneath the screen and drained into a tank. This tank must be designed in accordance with this invention to hold from one-and-a-half to twice the volume of the basic viscous liquid—that is, the triethylene glycol or similar liquid chemical. This is an extremely important aspect of this invention.

In the wintertime, when cleaning and humidification is primarily employed, an 80% concentration by volume, of triethylene glycol in the water solution is essential to maintain a condition of about 40% relative humidity and 70 degrees dry bulb in an enclosure in which most of the air is recirculated. Since some of the water evaporates in maintaining this humidity, it must be replaced by fresh water to maintain the proper concentration of triethylene glycol or other chemical in the water solution. Another important object of this invention, therefore, is to provide means for the introduction of additional water to maintain the concentration in the solution at the correct percentages in order to maintain the relative humidities recited.

Another object of the invention is to provide practicable simple apparatus for effecting the foregoing that may be produced quantitatively at low cost with a minimum of working parts and assembly procedure.

To the accomplishment of the foregoing and such other objects as may hereinafter appear, this invention consists in the novel method, and in the novel construction and arrangement of parts hereinafter described in detail and then sought to be defined in the appended claims, reference being had to the accompanying drawing which forms a part hereof, and which shows merely for the purposes of illustrative disclosure, a preferred embodiment of the invention, it being expressly understood, however, that various changes may be made in practice within the scope of the claims without digressing from the inventive idea.

In the drawing in which similar reference characters denote corresponding parts:

Fig. 2 is a side elevation partially in section and viewed from the left of Fig. 1; and Fig. 3 is a diagrammatic showing of the application of the device for conditioning air in conjunction with a hot air furnace in a house.

Figure 1:
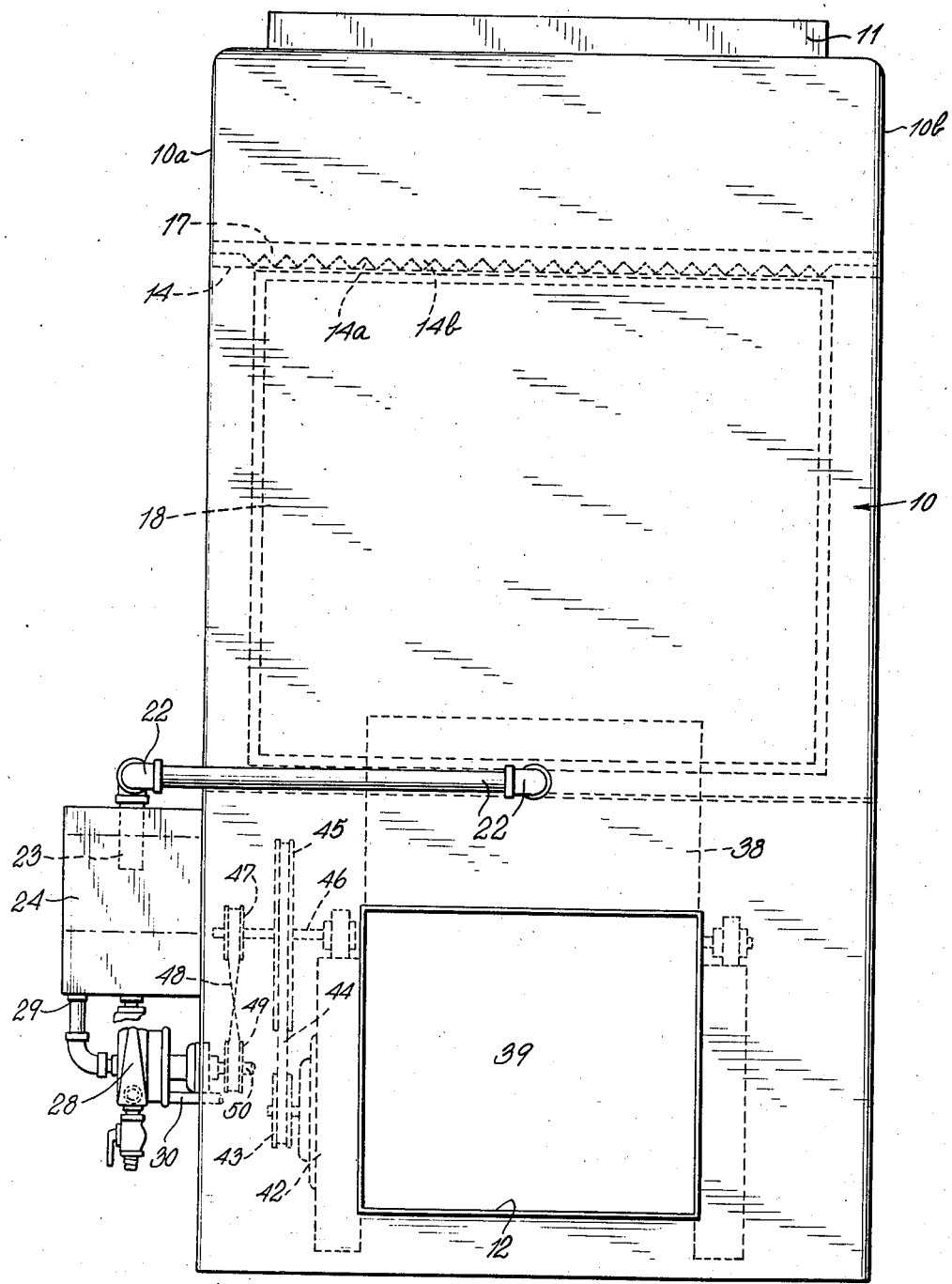
Fig. 1 is an end elevational view of apparatus that may be used in the practice of this invention.

Referring to the drawing 10 denotes a casing of suitable material that is provided with a gas or an inlet opening 11, preferably in its top and a gas or air outlet opening 12 in one of its sides in the lower portion thereof.

A water trough or dumping pan 13 (similar, for example, to that described in said Allen patent) is loosely pivoted at 14' so as to dump or tilt under the weight of a predetermined amount of liquid therein. In the embodiment shown, the stop or abutment strip 16 prevents tilting of the pan 13 in counterclockwise direction, but permits such tilting in clockwise direction when liquid of predetermined amount (approximately 2 gallons herein for proper flushing) is delivered to the pan 13 to discharge the contents of the latter.

The discharging contents of the pan 13 are dumped onto a substantially horizontal plate member 14. This member 14 extends the full width of the casing 10 between its opposite sides 10a, 10b and has a back splash wall 15 suspended for example from the top of the casing. A splash plate or front wall 16 extending parallel with the wall 15 is suspended suitably from the top 10 and its bottom edge 16a is spaced from the plate member 14 to provide an outlet passageway 17 for the dumped fluid. The forward edge 14a of the plate 14 extends beyond splash plate 16 and is upturned and provided with a plurality of outlet notches or openings 14b. This provides a means whereby the excess kinetic energy of the solution leaving the slope of the dumping pan 13 carries the major portion of the solution well beyond the top of the cell or screen 18 which is supported at an angle with the horizontal below the plate member 14, so that the largest part of the solution falls in a cascade on the lower part of the screen and is caught by collecting plate 19 supported below the screen or cell 18. As the dumping pan 13 empties the final small portion of the solution without any appreciable velocity remains to run out through the notches and down onto the top of the screen or cell 18 with such low velocity that it is caught by the filamentary glass strands of the cell or screen 18 (if the cell has the construction described in my aforementioned patent), or by wires in the screen (if the screen has the construction described, for example, in the aforementioned Allen patent) and clings to the strands or wires and runs down the latter. There is practically no excess solution in the said remainder which strikes the top portion of the cell or screen, and this would be the only part of the solution having any tendency to be carried over by the air stream. The combination, therefore, of the dumping pan and the slotted or grooved distributing plate 14 imparts the energy to the major portion of the solution which is essential for operation without the introduction of eliminators. When water alone is used, the absence of eliminators in the cell or screen without special provision for distribution of the water to the cell or screen might result in the carrying by the air stream of droplets of water beyond the collecting plate or pan 20 into the room being conditioned. This would not be of much importance because the small loss of water would be immaterial. However, it becomes extremely important when triethylene glycol or other chemical is used with the water, because droplets then carried over would mean a loss of such chemical and would require frequent replenishment to maintain the proper balance noted hereinabove between the chemical and water solution. The use of eliminators ordinarily would be required to remedy this situation. However, the arrangement for distribution of dumped solution into the cell or screen herein described does away with any need for eliminators or baffles.

The dumping pan 13 may be similar in construction to that of said Allen Patent No. 1,696,935. In the alternative, the syphon construction of my aforementioned patent may be used to supply the glycol water solution intermittently to the cell or screen 18 through the plate member 14 with its grooves 14a.

As only a very small amount of the total solution is required for cleaning purposes and as the thorough wetting of the lower section of the cell or screen 18 provides ample moisture for humidification, this method of elimination of eliminator plates tends to better results with this type of mixture or solution than even the thorough washing or spraying of the entire sloping screen or cell and, for household use particularly, allows of the elimination of resistance interposing surfaces or eliminators which would add to the power required for operation.

As noted, the screen or cell 18 is suspended angularly at approximately between 50° and 60° with the horizontal, with its upper end suitably secured at 19 directly below the upturned edge 14a of the distributing plate 14. The lower end of the screen or cell 18 extends downwardly and forwardly of the edge 14a and rests or is fastened suitably to a collecting member or pan 20.

This collecting member or pan 20 is in the form of a trough having a sloping bottom 21 that lies below the cell or screen 18 to catch fluid dropping or draining from the latter. A single outlet at the lower end of the bottom 21 is connected by conduits 22 to a drain spout 23 that delivers the collected fluid to a tank 24 supported suitably from the casing 10.

This tank 24 in the embodiment shown has a capacity of approximately five gallons, that is, a larger capacity than is required for normal winter time operation for reasons that will be presently described.

A suitable inlet conduit 25 is connected to a source of water supply (not shown) and the delivery of water to the tank 24 from said conduit is controlled by any conventional float operated valve 26 whose float 27 in the embodiment shown is positioned permanently to cut off water supply to the tank as long as its content remains above a certain amount to be described. This is important for a number of reasons. If the dumping pan 13 or similar equipment holds the two gallons essential for proper flushing of the cell or screen 18, then for winter use the tank 24 must hold at least four gallons of solution so that two gallons can be drawn by a pump 28 from an outlet 29 of this tank and discharged into the dumping pan 13 through a conduit 30 and discharge nozzle 31. In the tank 24 which contains the total volume of solution, the float 27 is positioned to cut off water delivery at the level of the remainder left in the tank 24 after the dumping volume (two gallons in this embodiment) is withdrawn. If water is evaporated during the period after a dump, then on the next filling of the dumping tank 13 the level remaining in the tank 24 will be reduced below the cut-off level of the float 27 and water will flow into the tank 24 to replace the evaporated water. As the chemical, such as triethylene glycol or similar viscous material, is minute in its evaporative characteristics, the diminution in the height of liquid in the tank 24 is due primarily to the evaporation of water, and consequently the introduction of additional water when the valve 26 opens maintains the concentration in the solution at the right percentages to maintain the relative humidities indicated. The valve 26 of course closes as soon as the float 27 rises to its cut off level.

On the other hand, in the summertime, or when the dry bulb temperatures rise, the solution of triethylene glycol and water, or similar solutions, tends to become a dehydrator, the vapor pressure of the solution changing and water being absorbed by the solution rather than evaporation taking place from the cell or screen 18. In such periods, water will be taken up by the triethylene glycol in solution until a different or weaker concentration is developed so that with normal conditions of atmospheric pressure, existing, for instance, in the United States, possibly twice as much water with the same amount of triethylene glycol or similar solution will be deposited in the tank 24. In order to prevent the overflow of solution and the loss of the expensive material, the tank 24 must be designed for, say, five gallons instead of the four which is its normal operating volume in winter-time. However, as the float control valve 26 is set permanently at the winter level, the summer-time level in the tank 24 always remains above the cut-off level of the float 27 and no additional water will be supplied to the solution during this period. In this way, by having the tank 24 designed for the variation in the vapor pressure characteristics of the particular solution, definite humidities can be maintained during the artificially created heating season, and safety factors for the saving of the solution can be maintained during the free or mild season. In this way the simplest type of control of humidity is maintained over a wide period of the year without thermostatically sensitive instruments, which respond to the moisture content of the air.

The solution mentioned has an additional property of holding the dust particles in suspension. Consequently, with the type of agitation due to the removal of the solution from the tank 24 by means of the pump 28 a very large amount of dirt and dust can be held in solution without affecting the operation of the system. When the dirt content of the solution becomes noticeably great, a valve 33 in the discharge line 30 of the pump 28 to the intermittent dumping pan 13 can be shut off and a supplementary valve 34 between the pump and this valve opened so that all of the solution, including dirt and dust particles contained therein, can be pumped out or drained out to a filter bottle (not shown) for cleaning and filtration of the solution. When all of the solution has been pumped or drained from the tank 24, the drain valve 34 can be closed, the circulating valve 33 reopened, valve 34 closed, a water valve 35 in the line to the float controlled valve 26 is provided and can be opened and the entire system flushed out with plain water which can then be discharged to the sewer (not shown) through a drain valve 36. The valves 35 and 36 are then closed. Then the cleaned solution can then be put back into the tank 24, the water valve 35 to the float valve 26 re-opened, and, automatically, the concentration of solution will take place so that operation of the system under normal conditions, as hereinbefore described, can take place again.

As a small amount of the triethylene glycol will be evaporated, from time to time the strength of the solution should be tested with a hydrometer, and the amount of triethylene glycol or similar solution which has been evaporated should be replaced to bring about the normal conditions for operation and humidification. Ordinarily, a monthly test will be sufficient.

If the concentration of the solution has been found to show only a slight decrease due to the slight evaporation of the triethylene glycol or equivalent substance, chemical replacement can be avoided by making only a slight change in the cut-off setting of the float valve 26. Thus it is possible to utilize the apparatus for long periods of time without requiring any replacement of chemical. The actual need for replacement will show up in increased humidity in the air treated.

The air to be conditioned is circulated by means of a suitable fan 38. This fan 38 is positioned suitably within the casing 10 so that its discharge outlet 39 discharges air or gas through opening 12 in the case. The suction inlet 40 of the fan 38 opens into the casing 10 so as to draw air from the casing inlet 11 downwardly through cell 18 in the general path indicated by the arrows A (Fig. 2).

The fan 38 is driven suitably by a motor 42 supported suitably within the casing 10, its sheave 43 being coupled, for example, by belting 44 or equivalent drive to the sheave 45 on the fan shaft 46. An additional sheave 47 on the latter shaft is coupled for example by belting 48 to a sheave 49 on the shaft 50 of pump 28 so that the same motor serves both to drive the fan 38 and pump 28. Other suitable means for effecting such drive may, of course, be employed.

The apparatus and method described may be used directly for conditioning a room or enclosure. It may also for example be used in conjunction with a heating system such as a hot air heating system. When so used, as illustrated diagrammatically in Fig. 3, the casing 10 and its contents may be positioned adjacent to the hot air furnace F. An air inlet conduit 50 for leading air from the outside of the house H is connected to the inlet 11 of casing 10. The delivery outlet 12 of the casing is connected by a conduit 51 to the air inlet 52 of the furnace F so that conditioned air from the device of the invention is delivered to the furnace F, heated therein and from the latter is delivered by conduit or conduits 53 to the room R or rooms of the house H.

Normally, the amount of solution which has to be pumped into the tilting pan 13 is of the nature of one-seventh to one-tenth of a gallon per minute in the embodiment shown. Consequently, any small, even inefficient pumping arrangement will supply the necessary flushing action without any appreciable loss in overall efficiency.

The equipment described lends itself, by the very nature of the characteristics of the solution, to cooling as well as humidification, for when major evaporative cooling is required the supplementary tank 24 can be made still larger in capacity and the strength of the solution reduced to allow of greater evaporation. It is important to bear in mind the two following fundamental characteristics of this invention; although with triethylene glycol and water a perfect solution is obtained, the viscosity of the triethylene glycol holds to the strands of the cell or screen, irrespective of the evaporation or flow of the liquid, and it has the ability of the viscous material to cling during the off period of dumping which creates the cleaning which is so essential in the non-dumping period. Moreover, the triethylene glycol or other chemical used not only has the ability of clinging to the strands but of remaining viscous. The nature of the basic substance being an absorber and taking a condition of equilibrium with the vapor pressure of the moisture of the air coming in contact with it, it will pick up a very slight amount of moisture from the air as the glycol or similar substance tends to dry out and then when it has reached an equilibrium it will give up a tiny amount of moisture again to always maintain an equilibrium. In this way without effecting in any material way the condition of the leaving air it remains in a state to pick up the dust throughout the off period and consequently is in itself sufficiently unset to be washed off with its clinging dust particles during the flushing period. This property is of great importance because it is apparent that cleaning is enhanced by a substance which retains its viscosity.

While a specific embodiment of the invention has been disclosed, it is to be understood that changes may be made in practice and are contemplated. The size and dimensions of the devices are not to be construed as limited to those described as they may be varied in practice to suit different operating requirements. There is no intention of limitation to the exact details shown and described.

What is claimed is:

1. Apparatus for conditioning a gaseous fluid such as air under wintertime conditions in an enclosure wherein the fluid is largely recirculated to a prescribed humidity and for cleaning thereof, comprising a casing having an inlet for such fluid in its top and an outlet for the conditioned fluid in one of its sides in a lower portion thereof, a tank for a glycol-water containing solution of desired concentration supported by said casing, a conduit for connecting said tank to a source of water supply, a float-operated valve in said conduit, a float for operating said valve, a tiltable trough positioned in said casing above the level of said tank and adapted to tilt to a dumping position under the weight of a prescribed amount of said solution delivered thereto, means for pumping said solution from said tank to said trough, a substantially horizontal plate member onto which the prescribed amount of solution in said trough is dumped periodically with each tilting of said trough, a substantially vertical splash plate in conjunction with said horizontal plate member, a filtering screen positioned within said casing at an angle with the horizontal and below said horizontal plate member onto which the solution dumped onto said horizontal plate falls, a collecting trough having a sloping bottom positioned below said screen to catch the portions of the solution falling from said screen and means to return such solution portions from said collecting trough to said tank, said float being positioned to operate said valve to cut-off at the level of the remainder of initial solution in said tank just after the first prescribed dumping amount has been pumped therefrom to said dumping trough, and to permit said valve to open whenever the solution in said tank is below such level whereby replenishment of water evaporated from the solution in its travel from dumping trough back to said tank will be effected to restore the desired glycol-water solution concentration, and a fan within said casing for drawing the fluid to be conditioned through said inlet and through said filtering screen and for thereafter blowing the conditioned fluid outwardly through said casing outlet.

2. Apparatus for conditioning a gaseous fluid such as air under wintertime conditions in an enclosure wherein the fluid is largely recirculated to a prescribed humidity and for cleaning thereof, comprising a casing having an inlet for such fluid in its top and an outlet for the conditioned fluid in one of its sides in a lower portion thereof, a tank for a glycol-water containing solution of desired concentration supported by said casing, a conduit for connecting said tank to a source of water supply, a float-operated valve in said conduit, a float for operating said valve, a tiltable trough positioned in said casing above the level of said tank and adapted to tilt to a dumping position under the weight of a prescribed amount of said solution delivered thereto, means for pumping said solution from said tank to said trough, a substantially horizontal plate member onto which the prescribed amount of solution in said trough is dumped periodically with each tilting of said trough, a filtering screen positioned within said casing below said horizontal plate member onto which the solution dumped onto said horizontal plate falls, a collecting trough positioned below said screen to catch the portions of the solution falling from said screen and means to return such solution portions from said collecting trough to said tank, said float being positioned to operate said valve to cut-off at the level of the remainder of initial solution in said tank just after the first prescribed dumping amount has been pumped therefrom to said dumping trough, and to permit said valve to open whenever the solution in said tank is below such level whereby replenishment of water evaporated from the solution in its travel from dumping trough back to said tank will be effected to restore the desired glycol-water solution concentration, a fan within said casing for drawing the fluid to be conditioned through said inlet and through said filtering screen and for thereafter blowing the conditioned fluid outwardly through said casing outlet, and said tank having a capacity which is approximately 25% in excess of the required volume of said glycol-water containing solution for wintertime air conditioning.

3. Apparatus for conditioning a gaseous fluid such as air under wintertime conditions in an enclosure wherein the fluid is largely recirculated to a prescribed humidity and for cleaning thereof, comprising a casing having an inlet for such fluid in its top and an outlet for the conditioned fluid in one of its sides in a lower portion thereof, a tank for a glycol-water containing solution of desired concentration supported by said casing, a conduit for connecting said tank to a source of water supply, a float-operated valve in said conduit, a float for operating said valve, a tiltable trough positioned in said casing above the level of said tank and adapted to tilt to a dumping position under the weight of a prescribed amount of said solution delivered thereto, means for pumping said solution from said tank to said trough, a substantially horizontal plate member onto which the prescribed amount of solution in said trough is dumped periodically with each tilting of said trough, a filtering screen positioned within said casing below said horizontal plate member onto which the solution dumped onto said horizontal plate falls, a collecting trough positioned below said screen to catch the portions of the solution falling from said screen and means to return such solution portions from said collecting trough to said tank, said float being positioned to operate said valve to cut-off at the level of the remainder of initial solution in said tank just after the first prescribed dumping amount has been pumped therefrom to said dumping trough, and to permit said valve to open whenever the solution in said tank is below such level whereby replenishment of water evaporated from the solution in its travel from dumping trough back to said tank will be effected to restore the desired glycol-water solution concentration, a fan within said casing for drawing the fluid to be conditioned through said inlet and through said filtering screen and for thereafter blowing the conditioned fluid outwardly through said casing outlet, and said tank having a capacity which is substantially greater than the volume of said glycol-water containing solution required for wintertime air conditioning to prevent loss of solution by overflow from the tank whenever operation of the device is continued in milder seasons of the year.

4. Apparatus for conditioning a gaseous fluid such as air under wintertime conditions in an enclosure wherein the fluid is largely recirculated to a prescribed humidity and for cleaning thereof, comprising a casing having an inlet for such fluid in its top and an outlet for the conditioned fluid in one of its sides in a lower portion thereof, a tank for a glycol-water containing solution of desired concentration supported by said casing, a conduit for connecting said tank to a source of water supply, a float-operated valve in said conduit, a float for operating said valve, a tiltable trough positioned in said casing above the level of said tank and adapted to tilt to a dumping position under the weight of a prescribed amount of said solution delivered thereto, means for pumping said solution from said tank to said trough, a substantially horizontal plate member onto which the prescribed amount of solution in said trough is dumped periodically with each tilting of said trough, a filtering screen positioned within said casing below said horizontal plate member onto which the solution dumped onto said horizontal plate falls, a collecting trough positioned below said screen to catch the portions of the solution falling from said screen and means to return such solution portions from said collecting trough to said tank, said float being positioned to operate said valve to cut-off at the level of the remainder of initial solution in said tank just after the first prescribed dumping amount has been pumped therefrom to said dumping trough, and to permit said valve to open whenever the solution in said tank is below such level whereby replenishment of water evaporated from the solution in its travel from dumping trough back to said tank will be effected to restore the desired glycol-water solution concentration, and a fan within said casing for drawing the fluid to be conditioned through said inlet and through said filtering screen and for thereafter blowing the conditioned fluid outwardly through said casing outlet.

WALTER L. FLEISHER.

REFERENCES CITED

The following references are of record in the file of this patent:

UNITED STATES PATENTS

| Number | Name | Date |
|---|---|---|
| 2,149,593 | Fleisher | Mar. 7, 1939 |
| 2,099,009 | Fenley et al. | Nov. 16, 1937 |
| 2,114,787 | Smith | Apr. 19, 1938 |
| 2,235,322 | Martin | Mar. 18, 1941 |
| 1,812,548 | Obermiller | June 30, 1931 |
| 1,841,536 | Jordahl | Jan. 19, 1932 |
| 2,353,936 | Smith | July 18, 1944 |
| 2,356,757 | Fleisher | Aug. 29, 1944 |
| 2,192,126 | Downs | Feb. 27, 1940 |
| 2,137,905 | Church | Nov. 22, 1938 |
| 1,976,401 | Ilg | Oct. 9, 1934 |
| 1,870,196 | Hegan | Aug. 2, 1932 |
| 1,895,597 | Williams | Jan. 31, 1933 |
| 1,521,578 | Wittemier | Dec. 30, 1924 |
| 1,757,690 | Strindberg | May 6, 1930 |